United States Patent
Pan et al.

(10) Patent No.: US 8,619,821 B2
(45) Date of Patent: Dec. 31, 2013

(54) SYSTEM, APPARATUS, AND METHOD FOR TIME-DIVISION MULTIPLEXED COMMUNICATION

(75) Inventors: Yang Pan, Shanghai (CN); Olafur M. Josefsson, Hafnarfjordur (IS); Dongqin Yan, Shanghai (CN); Camille L. C. J. Huin, Cambridge, MA (US)

(73) Assignee: Invensense, Inc., San Jose, CA (US)

( * ) Notice: Subject to any disclaimer, the term of this patent is extended or adjusted under 35 U.S.C. 154(b) by 295 days.

(21) Appl. No.: 13/071,836

(22) Filed: Mar. 25, 2011

(65) Prior Publication Data

US 2012/0243560 A1    Sep. 27, 2012

(51) Int. Cl.
*H04J 3/06*    (2006.01)
(52) U.S. Cl.
USPC ............ 370/517; 370/498; 370/503; 370/509
(58) Field of Classification Search
USPC .................................. 370/498, 503, 509–519
See application file for complete search history.

(56) References Cited

U.S. PATENT DOCUMENTS

| | | | |
|---|---|---|---|
| 6,072,804 A | 6/2000 | Beyers, Jr. ................... | 370/450 |
| 6,650,696 B1 | 11/2003 | Lin et al. ...................... | 375/219 |
| 6,782,007 B1 | 8/2004 | Redman ........................ | 370/509 |
| 6,799,234 B1 | 9/2004 | Moon et al. .................. | 710/110 |
| 6,937,957 B2 * | 8/2005 | Viard et al. .................. | 702/127 |
| 7,042,895 B1 | 5/2006 | Nguyen et al. ............... | 370/442 |
| 7,848,232 B2 | 12/2010 | Loffink et al. ................ | 370/230 |
| 8,213,634 B1 | 7/2012 | Daniel ........................... | 381/92 |
| 2002/0018458 A1* | 2/2002 | Aiello et al. .................. | 370/348 |
| 2002/0044565 A1* | 4/2002 | Park .............................. | 370/462 |
| 2005/0257177 A1* | 11/2005 | Chen et al. ..................... | 716/1 |
| 2006/0083213 A1* | 4/2006 | Kynast et al. ................. | 370/350 |
| 2007/0291971 A1* | 12/2007 | Halteren ....................... | 381/322 |
| 2008/0069151 A1* | 3/2008 | Satoh et al. ................... | 370/503 |
| 2010/0199009 A1* | 8/2010 | Koide ........................... | 710/110 |
| 2012/0243559 A1 | 9/2012 | Pan et al. ...................... | 370/503 |
| 2012/0243560 A1* | 9/2012 | Pan et al. ...................... | 370/517 |

FOREIGN PATENT DOCUMENTS

| | | | |
|---|---|---|---|
| EP | 1326172 | 7/2003 | ............ G06F 13/37 |
| JP | 06348649 | 12/1994 | ............ G06F 13/37 |
| WO | WO 96/36109 | 11/1996 | ............ H03G 3/20 |
| WO | WO 2010/059150 | 5/2010 | ............ G06F 13/00 |

OTHER PUBLICATIONS

Boyce, An Introduction to the Mobile Industry Processor Interface (MIPI) Alliance Standard—Serial Low-power Inter-chip Media Bus (SLIMbus™), MIPI Alliance, Inc., 20 pages, undated (believed to be circa 2008).
Cirrus Logic, Inc., AN301—Time Division Mutiplexed Audio Interface: A Tutorial, Cirrus Logic, AN301REV1, 4 pages, Sep. 2006.

(Continued)

*Primary Examiner* — Hassan Kizou
*Assistant Examiner* — Ashil Farahmand
(74) *Attorney, Agent, or Firm* — Maryam Imam; IPxLaw Group LLP

(57) ABSTRACT

A simplified bus arrangement using only three signal lines allows TDM data to be conveyed to or from a number of slave-only devices without the use of separate command line(s) and without any of the slave-only devices having to operate as a bus master or even support a master operating mode.

19 Claims, 15 Drawing Sheets

(56) References Cited

OTHER PUBLICATIONS

Texas Instruments Incorporated, "Low-Power, Highly-Integrated, Programmable 16-Bit, 26-KSPS, Dual-Channel CODEC," Texas Instruments, 56 pages, Mar. 2002.

Texas Instruments Incorporated, "TLV320AIC12—Low Power CMOS, 16-Bit, 26-KSPS Codec with Smart Time Division Multiplexed (SMARTDM™) Serial Port," Data Manual, 50 pages, May 2002.

Texas Instruments Incorporated, "TMS320C6000 DSP—Multichannel Audio Serial Port (McASP)—Reference Guide," Literature No. SPRU041J, 130 pages, Nov. 2008.

International Searching Authority, International Search Report—International Application No. PCT/US2012/030058, dated Jun. 19, 2012, together with the Written Opinion of the International Searching Authority, 11 pages.

U.S. Appl. No. 13/426,918, filed Mar. 22, 2012, Synchronization, Re-Synchronization, Addressing, and Serialized Signal Processing for Daisy-Chained Communication Devices, Pan et al.

U.S. Appl. No. 13/790,071, filed Mar. 8, 2013, Advanced TDM Daisy-Chain Communication Systems and Devices, Yan et al.

U.S. Appl. No. 13/790,081, filed Mar. 8, 2013, Distributed Automatic Level Control for a Microphone Array, Yan et al.

* cited by examiner

SYSTEM, APPARATUS, AND METHOD FOR TIME-DIVISION MULTIPLEXED COMMUNICATION

FIELD OF THE INVENTION

The present invention relates generally to a time-division multiplexed (TDM) communication system and more particularly to automatic synchronization of devices in a TDM communication system.

BACKGROUND OF THE INVENTION

In certain communication systems, multiple devices transmit data to a controller via a communication channel (e.g., a single-wire bus) that is logically divided into a number of successive time slots, with each time slot having a predetermined number of bits. Each device transmits data to the controller in one or more designated time slots according to a slot allocation scheme, which is fixed in some communication systems and variable in other communication systems. Often times, the devices transmit at fixed regular intervals, and therefore the communication channel is often logically divided into a number of frames with each frame containing a predetermined number of time slots, and each device transmits in its respective time slot(s) in each frame. Thus, for example, a first device may transmit in the first time slot of each frame, a second device may transmit in the second time slot of each frame, and so on. In some systems, devices may transmit in multiple time slots, for example, a first device may transmit in the first and second time slots of each frame, a second device may transmit in the third and fourth time slots of each frame, and so on. In some systems, different devices may transmit in different numbers of time slots, for example, a first device may transmit in the first time slot of each frame, a second device may transmit in the second and third time slots of each frame, a third device may transmit in the fourth time slot of each frame, and so on.

For convenience, N will be used herein to represent the number of time slots per frame, B will be used herein to represent the number of bits per time slot, and M will be used herein to represent the number of devices. A particular embodiment might have, for example, eight 32-bit slots per frame (i.e., N=8, B=32), although the present invention is not limited to any particular values of N and B. The actual data transmitted in each time slot may use all B bits or may use fewer than all B bits (e.g., a 24-bit sample of digital audio may be conveyed in a 32-bit time slot). In various systems, there may be a one-to-one relationship between a clock signal SCK and bits (e.g., one cycle of SCK for each bit) or there may be other relationships between SCK and bits (e.g., two or more cycles of SCK for each bit).

FIG. 1 schematically shows an exemplary system having a number of devices 1041-104M that transmit data to controller 102 in a TDM fashion, as known in the art. In this exemplary configuration, the controller acts as a bus master and all of the slaves operate as slave devices. The controller 102 provides a clock signal (SCK) and a frame synchronization signal (WS) to all of the devices 104. The controller 102 also sends commands to the devices 104 (e.g., based on a unique address for each device 104) over one or more command lines, for example, to configure the time slot(s) for each device 104 to transmit data over the data line (SD). Based on the SCK and FS signals, and the configuration information provided by the controller 102, each device 104 transmits in one or more designated time slots on the SD line.

FIG. 2 schematically shows another exemplary system having a number of devices 2041-204M that transmit data to controller 202 in a TDM fashion, as known in the art. In this exemplary system (which is similar to configurations shown and described in United States Publication US 2008/0069151 entitled "Variable Time Division Multiplex Transmission System" and filed by Satoh et al., which is hereby incorporated herein by reference in its entirety), each of the devices 204 includes both master operating logic and slave operating logic, and the operational mode of each device 204 may be set, for example, using a hardware pin on the device. In this exemplary embodiment, the first device 2041 is set to operate as the bus master (e.g., via the M/S pin) and provides a clock signal to both the controller 202 and the other devices 204, which are set to operate as slave devices (e.g., via the respective M/S pin). The device 2041 also provides a frame synchronization signal to the controller 202 to mark the start of each frame and provides a delayed synchronization signal to the second device 2042 in the chain to mark the start of that device's time slot(s). Each slave device in the chain, beginning with the second device 2042, provides a delayed frame synchronization signal to the next successive device in the chain.

SUMMARY OF EXEMPLARY EMBODIMENTS

In accordance with one aspect of the invention there is provided a time-division multiplexed communication system comprising a data line; a controller including a clock output for providing a clock signal, a frame sync output for providing a frame sync signal indicating the beginning of each of a number of successive frames, and a data pin coupled to the data line; and at least one slave-only device in communication with the controller. Each slave-only device including a clock input coupled to the clock output of the controller for receiving the clock signal, a data pin coupled to the data line, a frame sync input, and a frame sync output. The controller and the at least one slave-only device are interconnected in a chain configuration beginning with the controller, with the frame sync input of each slave-only device coupled to the frame sync output of the previous device in the chain. The controller provides the frame sync signal on its frame sync output and during a data passing mode each slave-only device provides a delayed frame sync signal from its frame sync input to its frame sync output and accesses the data line via its data pin in a predetermined set of time slots per frame for at least one of transmitting data to the controller and receiving data from the controller, with the predetermined set of time slots selected by the slave-only device based solely on the frame sync signal received on its frame sync input and the clock signal received on its clock input.

In various alternative embodiments, one or more of the slave-only devices may include a digital MEMS microphone. The system may include a single slave-only device or may include a plurality of slave-only devices in the chain, and the number of slave-only devices in the chain may be fixed or variable. All of the slave-only devices may be configured to access the same number of time slots per frame (e.g., one slot per frame, two slots per frame, etc.), or at least two slave-only devices may be configured to access different numbers of time slots per frame (e.g., one device may access one slot per frame, another device may access two slots per frame, etc.). All of the slave-only devices may be the same type of device (e.g., all digital MEMS microphones), or at least two of the slave-only devices may be different types of devices. In certain embodiments, a plurality of slave-only devices may be integrated onto a single chip, which may also include the controller.

In further embodiments, each slave-only device may be configured to determine a maximum number of slave-only devices supported by the controller based on the clock signal and the frame sync signal (e.g., by counting the number of clocks per frame, determining therefrom the number of slots per frame, and determining therefrom the maximum number of slave-only devices supported). The data pin of each slave-only device may include a programmable driver, in which case each slave-only device may be configured to program a power setting of the programmable driver based on the maximum number of slave-only devices supported by the controller.

It should be noted that embodiments may be implemented with the data pin of each slave-only device configured as an output for transmitting data to the controller via the data line, with the data pin of each slave-only device configured as an input for receiving data from the controller via the data line, or with the data pin of each slave-only device configured as an input/output pin to allow for bi-directional communication between the controller and the slave-only device(s).

In accordance with another aspect of the invention there is provided a device for operation in a time-division multiplexed communication system. The device includes a clock input for receiving a clock signal, a frame sync input for receiving a frame sync signal indicating the start of each of a number of successive frames, a frame sync output for outputting a delayed frame sync signal, and a slave-only TDM bus interface coupled to the clock input, the frame sync input, and the frame sync output and including a data pin for coupling to a data line. The TDM bus interface is configured to provide, during a data passing mode, a delayed frame sync signal from the frame sync input to the frame sync output and to access the data line via the data pin in a predetermined set of time slots per frame for at least one of transmitting data onto the data line and receiving data from the data line, with the predetermined set of time slots selected by the slave-only TDM bus interface based solely on the frame sync signal received on the frame sync input and the clock signal received on the clock input.

In various alternative embodiments, the device may include a digital MEMS microphone. The TDM bus interface may be configured to determine a maximum number of slave-only devices supported in a chain based on the clock signal and the frame sync signal received on the frame sync input (e.g., by counting the number of clocks per frame, determining therefrom the number of slots per frame, and determining therefrom the maximum number of slave-only devices supported). The data pin may include a programmable driver, in which case the TDM bus interface may be configured to program a power setting of the programmable driver based on the maximum number of slave-only devices.

It should be noted that embodiments may be implemented with the data pin configured as an output for transmitting data onto the data line, with the data pin configured as an input for receiving data from the data line, or with the data pin configured as an input/output pin to allow for bi-directional communication over the data line.

BRIEF DESCRIPTION OF THE DRAWINGS

The foregoing and advantages of the invention will be appreciated more fully from the following further description thereof with reference to the accompanying drawings wherein.

It should be noted that the foregoing figures and the elements depicted therein are not necessarily drawn to consistent scale or to any scale. Unless the context otherwise suggests, like elements are indicated by like numerals.

DETAILED DESCRIPTION OF SPECIFIC EMBODIMENTS

In embodiments of the present invention, a simplified bus arrangement using only three signal lines allows a controller to send TDM data to a number of slave-only devices and/or receive TDM data from a number of slave-only devices without the use of command line(s) and without any of the slave devices having to operate as a bus master or even support a master operating mode. The controller is configured to provide a bit clock signal SCK and a frame synchronization signal WS marking the start of each frame. The SCK signal is passed to all slave devices, while the WS signal is passed to the first device in the chain and is daisy-chained from slave-to-slave, with each slave adding a predetermined amount of delay to the WS signal. Based on the SCK signal and the daisy-chained WS signal, each slave device is able to automatically determine its respective time slot(s) without any special signaling from a master device. Among other things, embodiments of the present invention allow the command line(s) to be eliminated or omitted and also allow the master logic (and M/S pin) to be eliminated or omitted from the slave devices, thereby providing space savings, reduced complexity, and/or reduced power consumption for both the controller and the slave devices, particularly in embodiments where multiple slave devices are incorporated into a single device (e.g., where the same slave device logic block is replicated M times on a wafer or integrated circuit and none of the slave device logic blocks include master logic or command lines). Typically, controller operation is the same regardless of the actual number of slave devices on the data line, greatly simplifying system design and operation.

Figure 1:
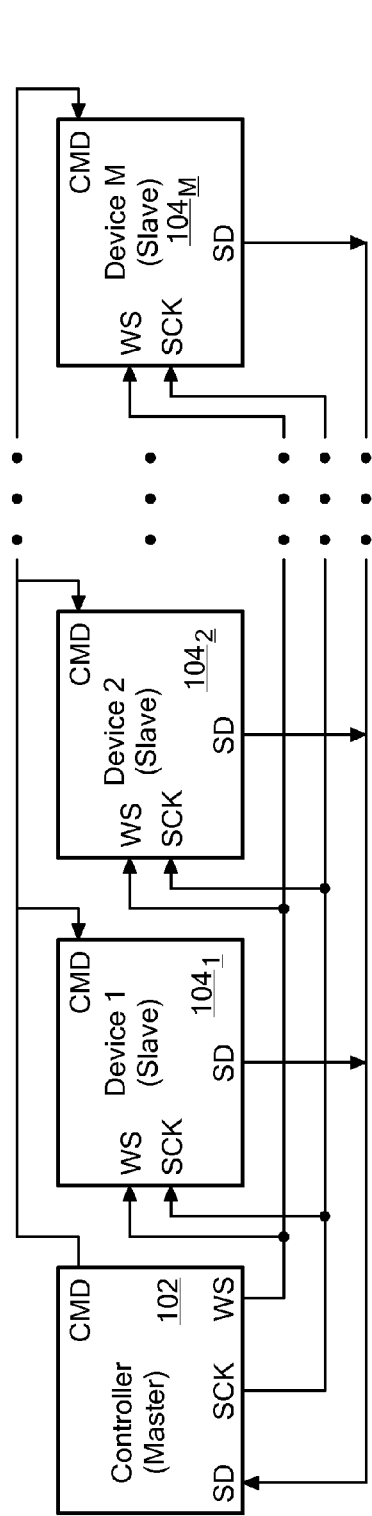
FIG. 1 schematically shows an exemplary system having a number of devices that transmit data to a controller in a TDM fashion, as known in the art.
Figure 2:
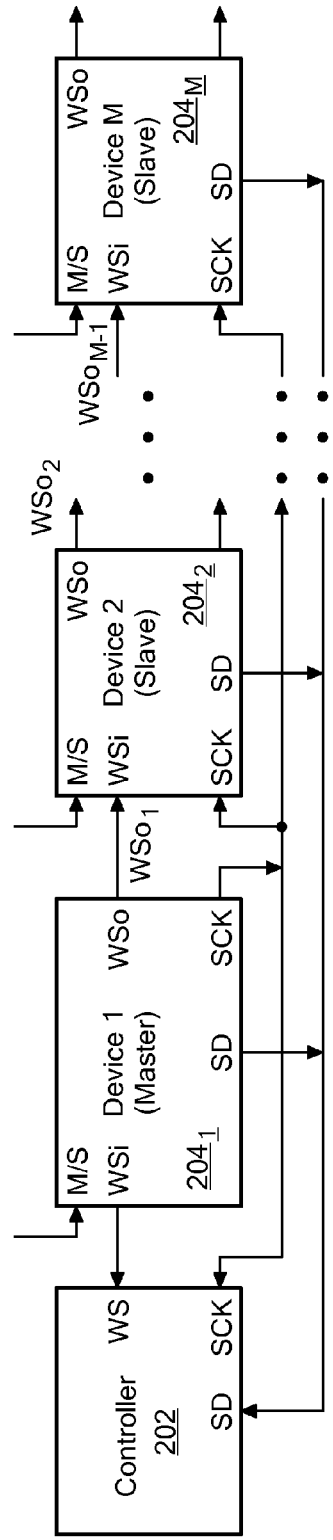
FIG. 2 schematically shows another exemplary system having a number of devices that transmit data to a controller in a TDM fashion, as known in the art.
Figure 3:
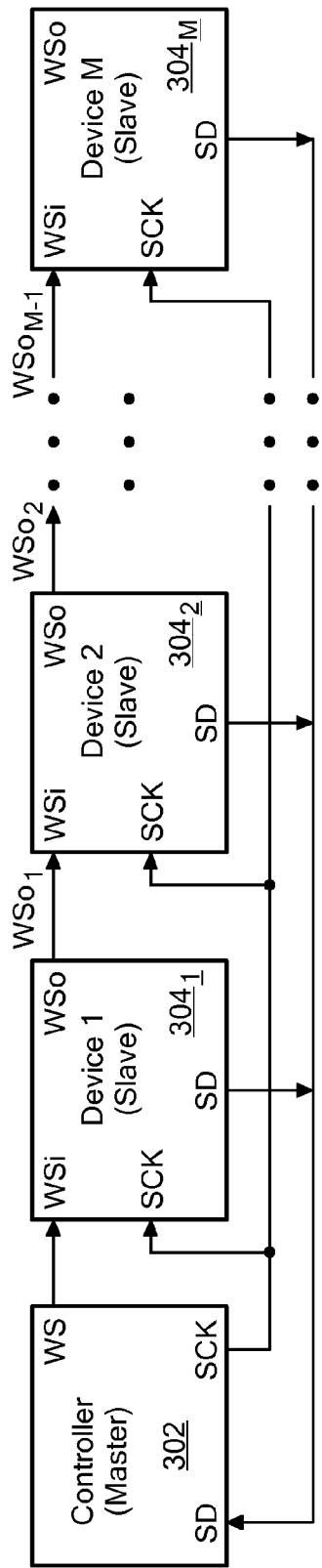
FIG. 3 schematically shows a TDM communication system in accordance with an exemplary embodiment of the present invention.

FIG. 3 schematically shows a TDM communication system in accordance with an exemplary embodiment of the present invention. In this exemplary embodiment, the controller 302 operates as the bus master and provides SCK to all of the slave devices 304 and provides WS to the first slave device 3041, with the WS signal daisy-chained from the WS output (WSO) of each slave to the WS input (WSI) of the next successive slave (note that WSOx is the WSO signal from device x). The controller 302 may be configured to support a predetermined number of time slots per frame (N), and where each slave device is configured to transmit or receive in one time slot per frame, the daisy-chain can have up to N slave devices. In various embodiments, all or less than all of the time slots may be used. For example, the controller 302 may be configured to support up to sixteen slave devices each transmitting in one time slot per frame, and different variants may have from one to sixteen slave devices as necessary or desirable for a particular product or implementation (typically, N is a power of two, although this is not required). The number of slave devices may be fixed (e.g., M slave devices integrated on a single chip or a discrete design with a fixed number of parts) or may be variable (e.g., slave devices may be added or removed over time).

Once enabled, the slave devices typically start dividing the SCK input by a specific dividing ratio to generate an internal operational clock, such as for clocking an analog-to-digital converter (ADC) for producing digital samples of an analog input or clocking a digital-to-analog converter (DAC) to convert digital samples received over the SD line) in a manner discussed below and begin transmitting (or receiving) data on the SD line in a manner discussed below. The slave devices could be enabled in any of a variety of ways such as, for example, upon detecting the clock signal on the SCK line or using a separate chip enable signal (e.g., each slave device 304 may have a chip enable pin with the chip enable pins of the slave devices tied to a common chip enable signal such as a chip enable output pin of the controller 302 allowing for selective enablement of the slave devices or simply tied high to be always enabled). In embodiments of the present invention, the controller may be any appropriately programmed or configured device, such as a digital signal processor (DSP), microcontroller, integrated circuit, field-programmable gate array, discrete logic, etc. In specific embodiments described below, during normal (data passing) operation, the controller is configured to generate the WS and SCK signals such that fSCK=N*B*fWS (i.e., generating the WS signal every N*B cycles of SCK, e.g., for B=32 clocks SCK cycles per time slot and N=8 time slots per frame, fSCK=256*fWS), although other signal timing may be used in various alternative embodiments. Some types of devices (e.g., certain "off-the-shelf" DSPs and microcontrollers) have built-in programmable timers, and generation of the WS and SCK signals may involve appropriately programming the timers to produce the WS and SCK clocks at the appropriate frequencies. Alternatively, the controller may include custom hardware logic to produce the WS and SCK signals.

Also, in embodiments of the present invention, the slave devices can be any devices that transmit and/or receive digital information, such as, for example, devices that perform analog-to-digital conversion (e.g., digital MEMS microphones and other types of MEMS devices such as gyroscopes, accelerometers, pressure sensors, oscillators, etc., audio codecs, etc.), devices that perform digital-to-analog conversion, or other types of devices.

In one specific embodiment, the slave devices are digital MEMS microphones, where each digital MEMS microphone provides digitized audio samples to the controller. Compared with other kind of microphones, digital MEMS microphones are generally smaller, cheaper, and more flexible, and generally integrate the microphone, amplifier, analog-to-digital converter (ADC) as well as possibly certain digital signal processing blocks on a single chip. Multiple microphones are often used simultaneously to form an array, which can significantly improve system performance. Such microphone arrays are widely used in many fields, such as telephones, speech recognition systems, and acoustic source locations, to name but a few. The simple TDM interface described herein makes the implementation of such a microphone array simple and low cost.

Figure 4:
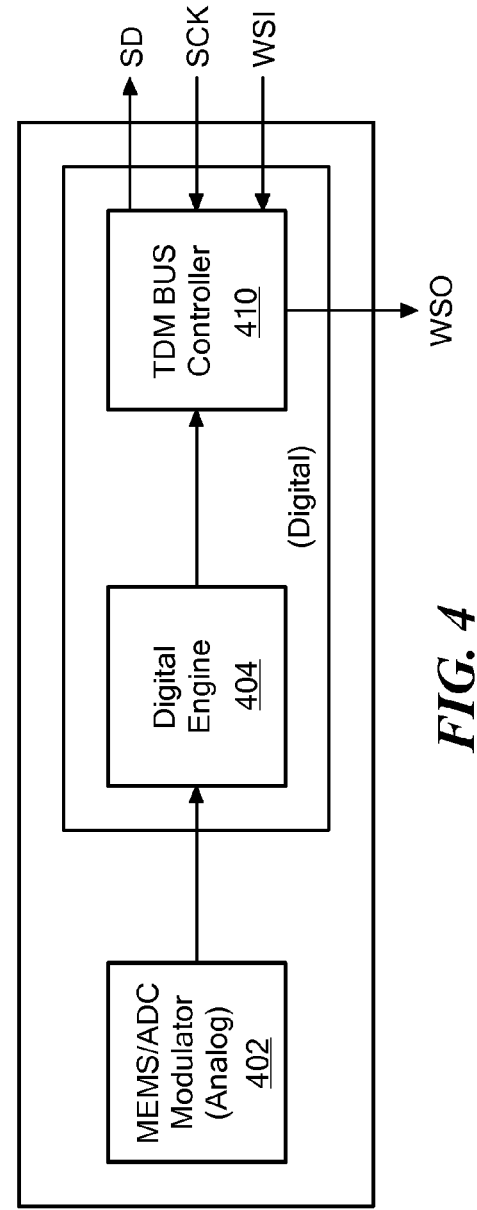
FIG. 4 schematically shows the relevant components of a digital MEMS microphone in accordance with an exemplary embodiment of the present invention.

FIG. 4 schematically shows the relevant components of a digital MEMS device such as a microphone or other device, in accordance with an exemplary embodiment of the present invention. Among other things, the digital MEMS device includes an analog portion including a MEMS device and ADC modulator 402, and also includes a digital portion including a digital engine 404 (e.g., the digital engine for a MEMS microphone might include such things as digital filters and controllers), and a TDM bus controller 410.

TDM Operation

Figure 5:
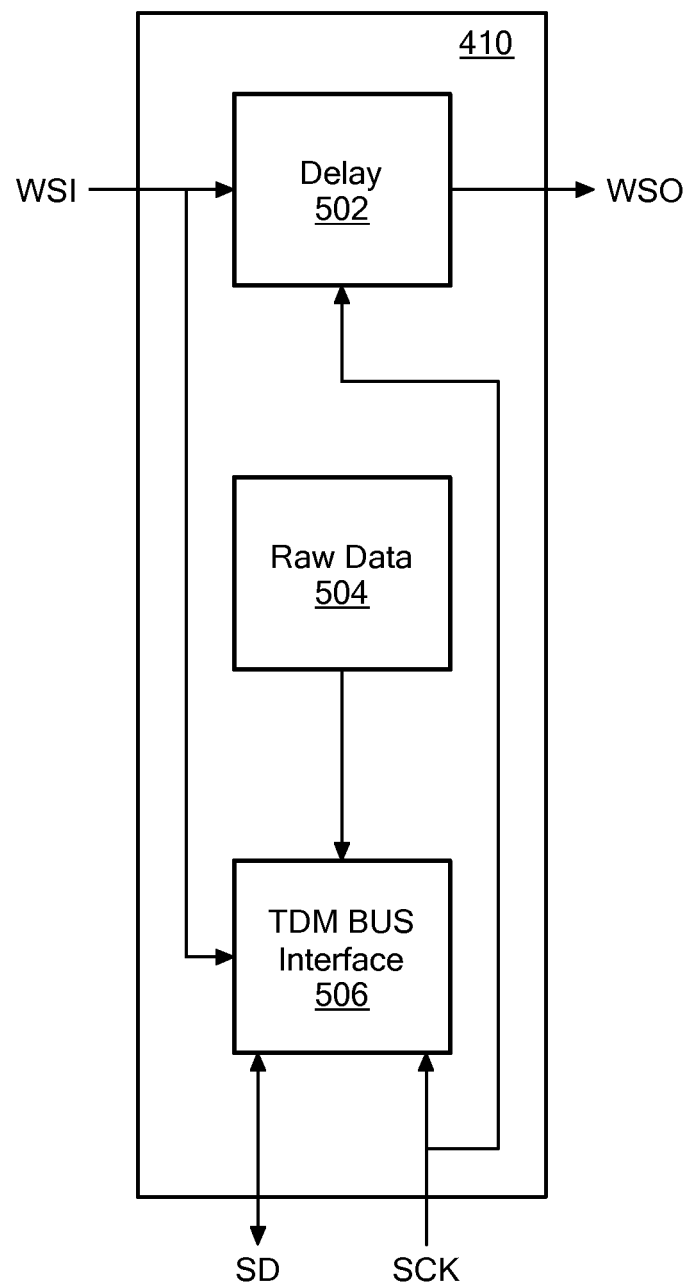
FIG. 5 schematically shows the relevant components of the TDM bus interface in accordance with an exemplary embodiment of the present invention.

FIG. 5 schematically shows the relevant components of the TDM bus controller 410 in accordance with an exemplary embodiment of the present invention. It should be noted that while the TDM bus controller 410 is described here as a component of a digital MEMS device, such a TDM bus controller 410 applies generally to slave devices used in embodiments of the present invention. Among other things, the TDM bus controller 410 includes a delay block 502 that produces the WSO signal, which typically is the WSI signal delayed by the number of time slot intervals allocated to the slave device, where a time slot interval is equal to B bits. In a basic embodiment of the present invention in which there is a one-to-one relationship between SCK and bits and each slave transmits in a single time slot per frame, the delay block 502 typically delays the WSI signal by B cycles of SCK. As mentioned above, one or more slave devices may be configured to transmit or receive in multiple slots, in which case the delay block 502 would delay the WSI signal by the appropriate number of time slot intervals. The TDM bus controller 410 also includes a TDM bus interface 506 that transmits (or receives) raw data 504 via the SD line based on the WSI and SCK signals. For example, upon detecting the WSI signal, the TDM bus interface 506 may transmit raw data onto the SD line in the number of slots designated for the device or, similarly, may receive raw data from the SD line in the number of slots designated for the device.

Figure 6:
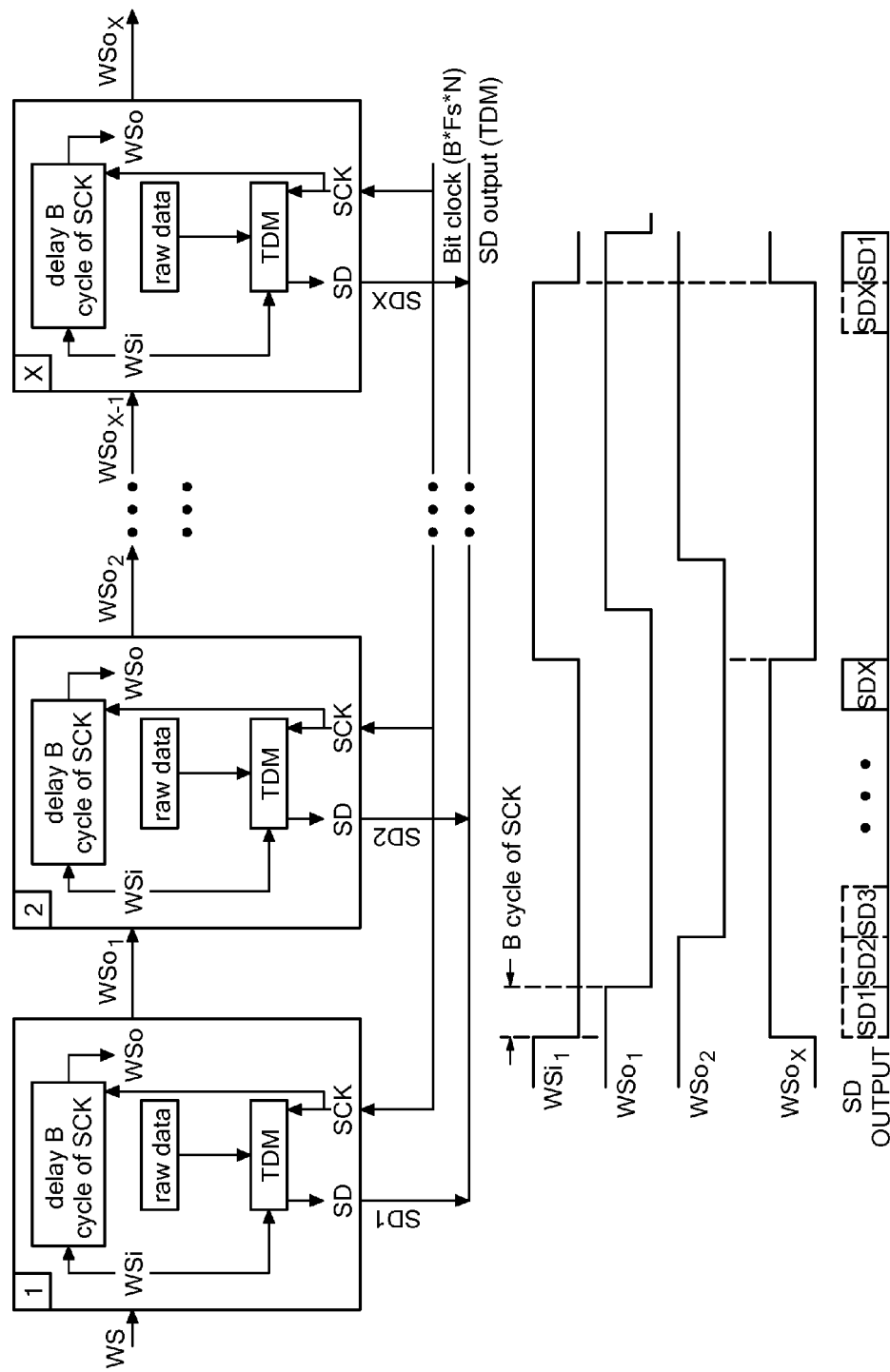
FIG. 6 schematically shows the general operation of the slave devices during a normal operating state, in accordance with an exemplary embodiment of the present invention.

FIG. 6 schematically shows the general operation of the slave devices during a normal operating state, in accordance with an exemplary embodiment of the present invention. During a normal operating state (which may be immediately upon enablement of the slave devices or may be after an initialization phase as discussed below), each slave device accesses the SD data line upon receiving a valid frame signal on its WSI pin, which in this example is a transition from high to low, although other signaling may be used (e.g., a transition from low to high, a signal level lasting a predetermined number of SCK cycles, or a predetermined sequence of transitions). Typically, the WS signal is just used to indicate the beginning of a frame, in which case the duty ratio of the WS signal is not particularly important and could be different for different implementations (a 50% duty cycle is shown). Typically, each slave device receives or transmits in one time slot per frame, e.g., each slave device receives or transmits up to B bits of data upon receiving the valid frame signal on its WSI pin. As mentioned above, one or more slave devices may be configured to utilize multiple slots, so, for example, a slave device configured to transmit or receive in two time slots transmits or receives up to (2*B) bits upon receiving the valid frame signal on its WSI pin. When not transmitting, the SD pin (output) of the slave device is tri-stated (i.e., high impedance state), which allows other slave devices to drive the bus. By daisy-chaining the WS signal and having each slave delay the WS signal by an integral number of time slot intervals (typically one time slot interval but possibly multiple time slot intervals), the slave devices access the SD line in successive time slots without requiring any commands from master device. It should be noted that the WSO signal of the last device in the daisy-chain (which, in this example, would be WSOM, not shown) is an unused signal that does not drive the WSI pin of another slave device.

Figure 7:
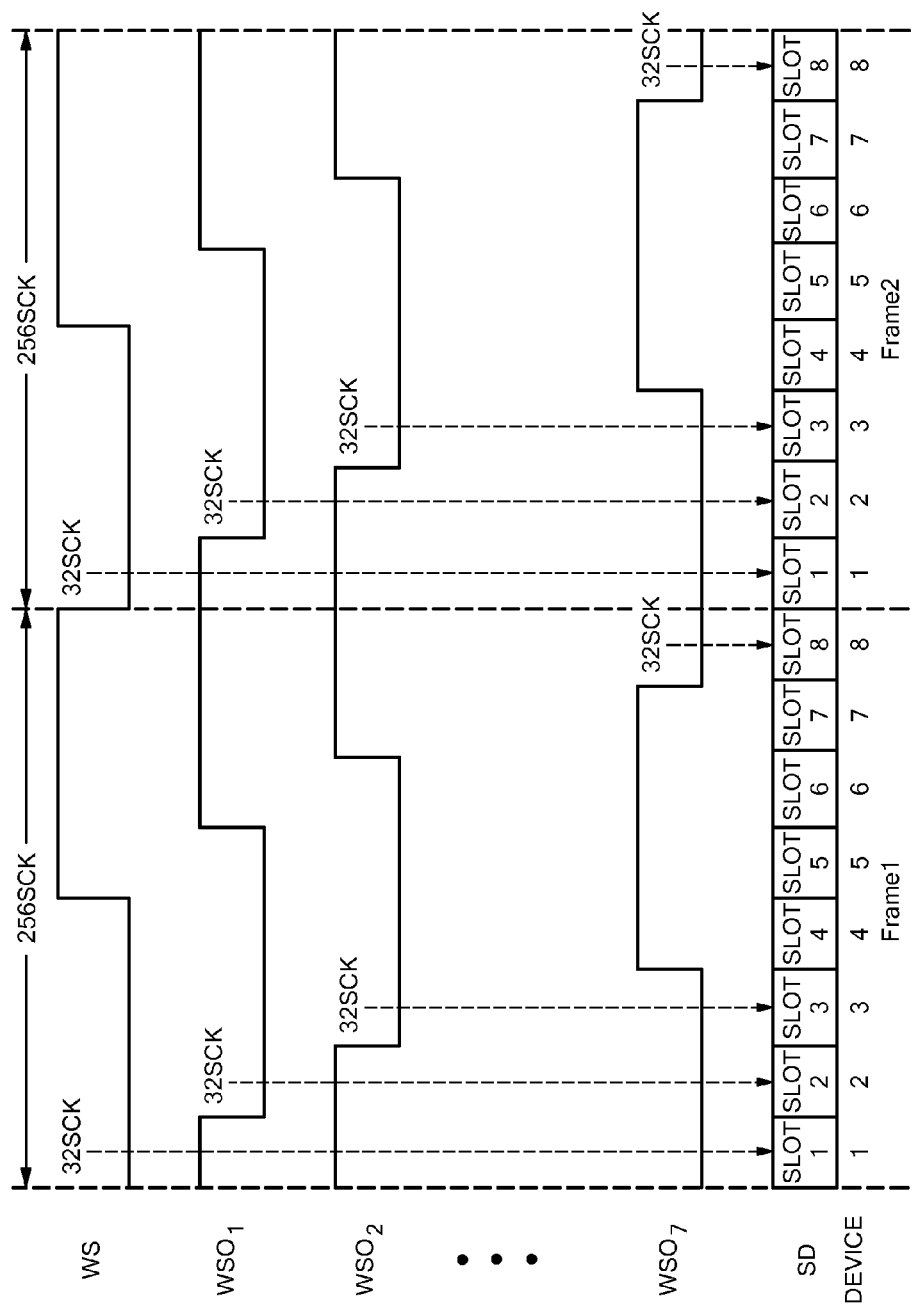
FIG. 7 schematically shows an exemplary timing diagram for an embodiment in which the controller supports up to eight time slots per frame (i.e., N=8) and there are eight slave devices in the chain (i.e., M=8) transmitting in one 32-bit time slot per frame.

FIG. 7 schematically shows an exemplary timing diagram for an embodiment in which the controller supports up to eight time slots per frame (i.e., N=8) and there are eight slave devices in the chain (i.e., M=8) transmitting or receiving in one 32-bit time slot per frame. The controller generates the SCK signal at a frequency of (N*B) or 256 times the frequency of the WS signal (i.e., fSCK=B*N*fWS=256*fWS). By daisy-chaining the WS signal, the eight slave devices transmit respectively in the eight successive time slots per frame.

Figure 8:
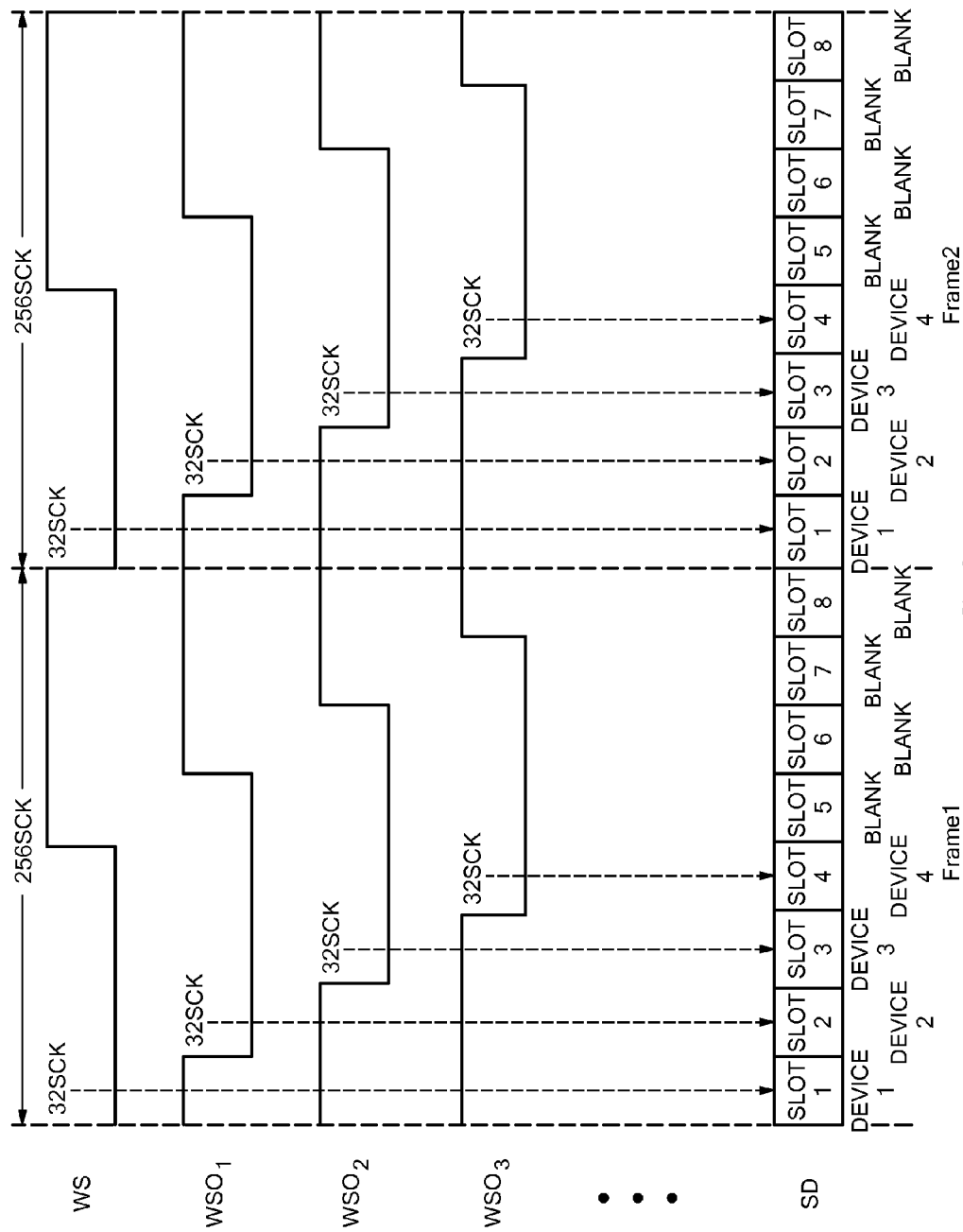
FIG. 8 schematically shows an exemplary timing diagram for an embodiment in which the controller supports up to eight time slots per frame (i.e., N=8) but there are only four slave devices in the chain (i.e., M=4) each transmitting in one 32-bit time slot per frame.

FIG. 8 schematically shows an exemplary timing diagram for an embodiment in which the controller supports up to eight time slots per frame (i.e., N=8) but there are only four slave devices in the chain (i.e., M=4) each transmitting or receiving in one 32-bit time slot per frame. In this example, the controller generates the SCK signal at a frequency of (N*B) or 256 times the frequency of the WS signal (i.e., fSCK=B*N*fWS=256*fWS). By daisy-chaining the WS signal, the four slave devices transmit or receive respectively in the first four successive time slots per frame, with the remaining four time slots per frame unused.

Figure 9:
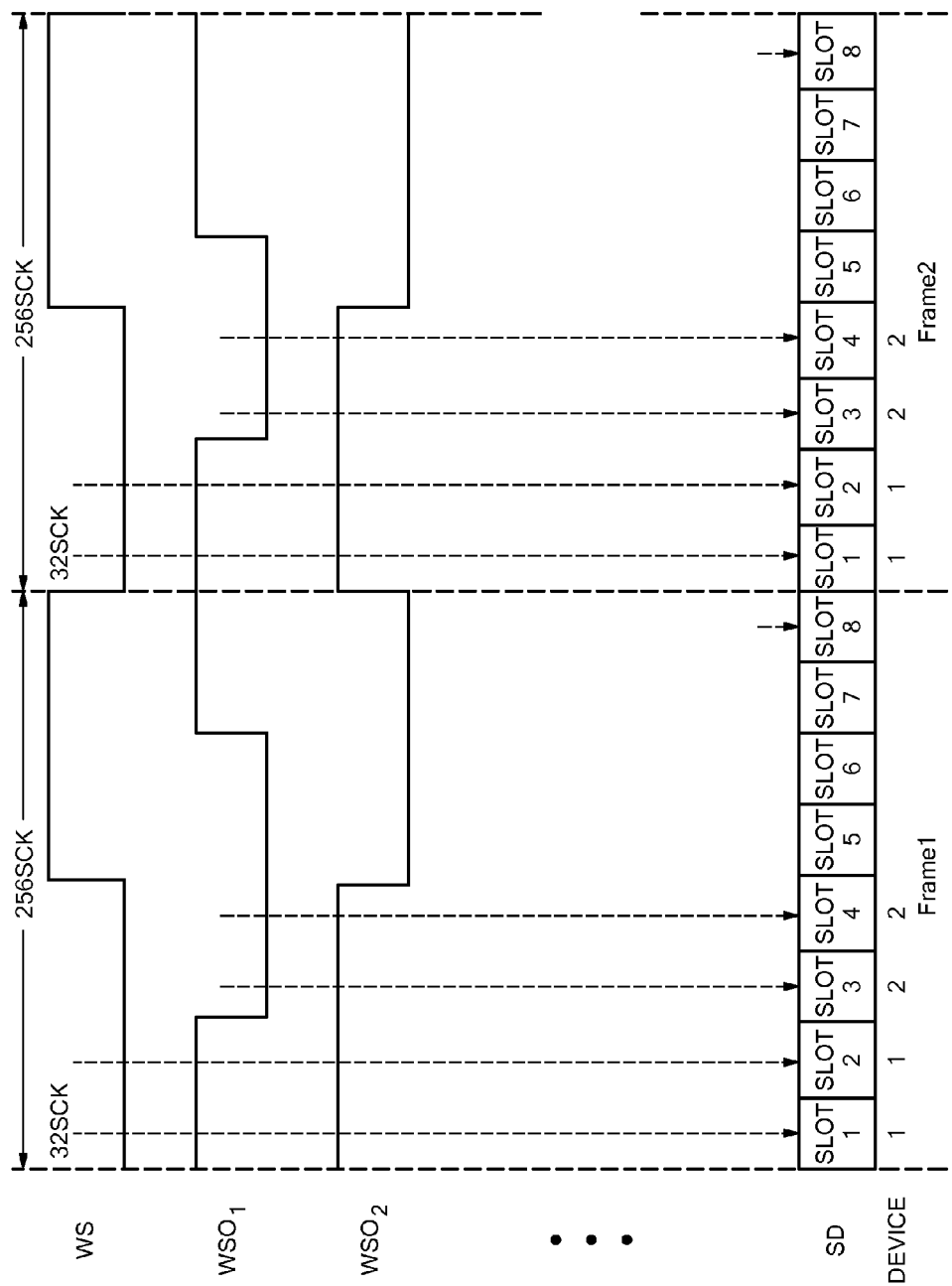
FIG. 9 schematically shows an exemplary timing diagram for an embodiment in which the controller supports up to eight time slots per frame (i.e., N=8) and the slave devices transmit in two successive 32-bit time slots per frame.

FIG. 9 schematically shows an exemplary timing diagram for an embodiment in which the controller supports up to eight time slots per frame (i.e., N=8) and the slave devices transmit or receive in two successive 32-bit time slots per frame (for convenience, timing for two device is shown).

It should be noted that the operation of the controller in generating the WS and SCK signals is the same for the embodiments shown in FIGS. 7-9 even though there are different numbers of slave devices and/or slot assignments.

Figure 10:
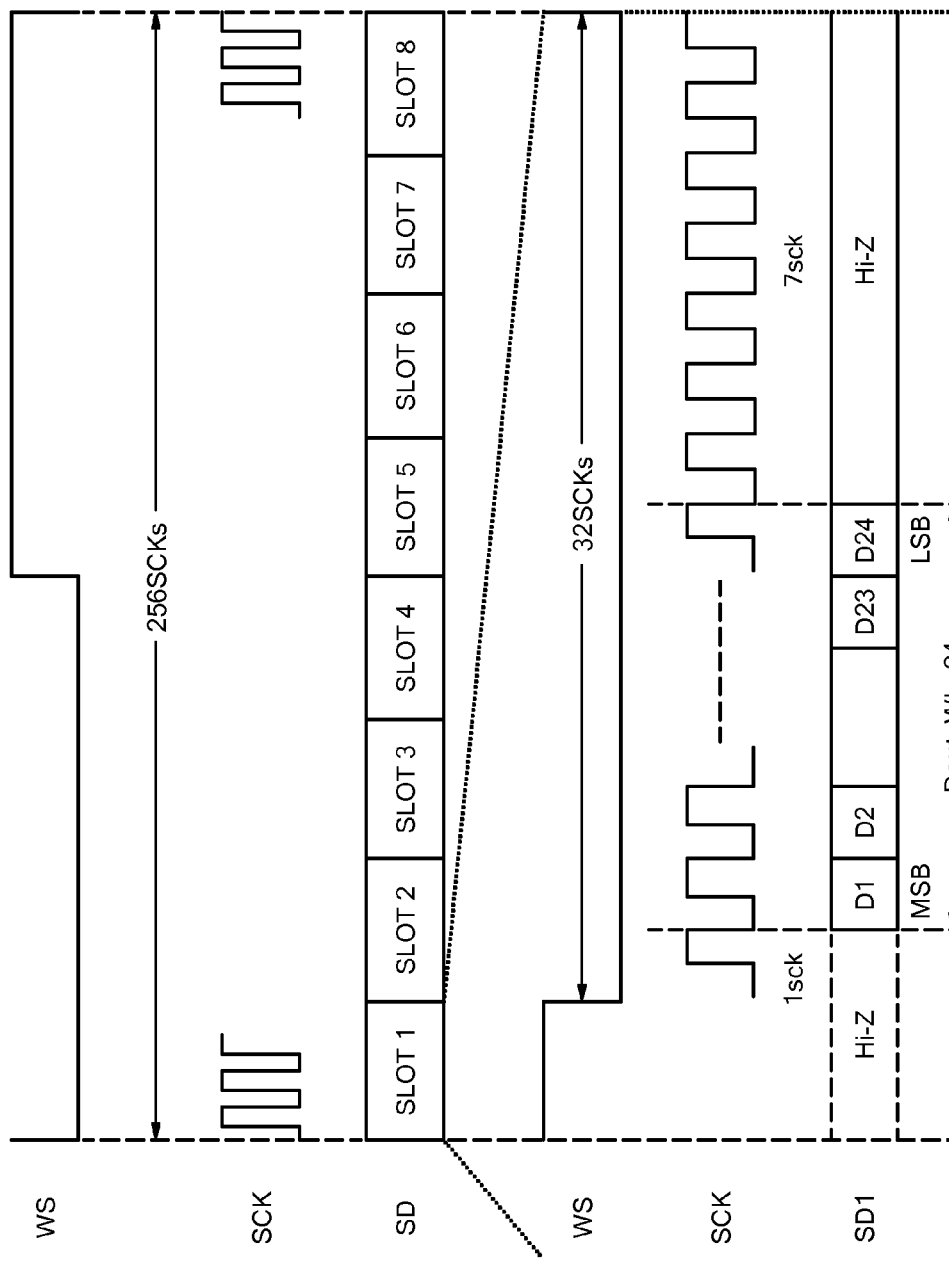
FIG. 10 schematically shows transmission of 24-bit samples in a 32-bit frame, in accordance with an exemplary embodiment of the present invention.

While each time slot on the TDM bus is B bits (e.g., 32 bits in the examples described above), the slave devices may transmit or receive fewer than B bits of raw data per time slot and thus some bits in the time slot may be unused. FIG. 10 schematically shows transmission of 24-bit data samples in a 32-bit time slot, in accordance with an exemplary embodiment of the present invention. In this example, upon detecting the frame synchronization signal on the WSI line, the slave device transmits or receives the 24-bit sample in bits D1-D24 of the time slot, where, in this example, D1 is delayed by one SCK cycle from receipt of the WSI signal and there are seven SCK clock cycles following D24. Transmission of 24-bit data samples may be particularly useful for audio applications such as digital MEMS microphones, where audio is converted into 24-bit samples (or alternatively into a bit stream that can be divided into 24-bit segments). It should be noted that this is but one example of conveying fewer than B bits per B-bit time slot.

Figure 11:
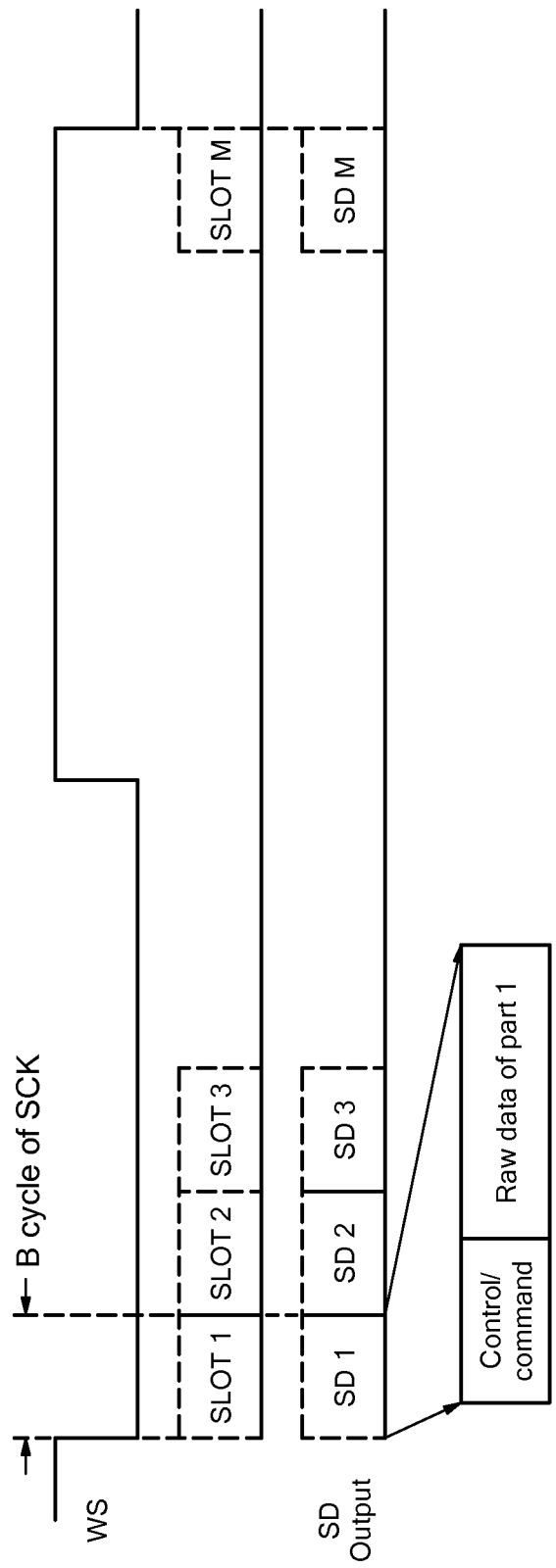
FIG. 11 schematically shows transmission of a command followed by raw data during a time slot, in accordance with an exemplary embodiment of the present invention.

Additionally or alternatively, other information may be conveyed along with the raw data in each time slot. FIG. 11 schematically shows transmission of control/command information followed by raw data during a time slot, in accordance with an exemplary embodiment of the present invention. For example, 8 bits of control/command information may be followed by 24 bits of raw data within a 32-bit time slot. The control/command information may be encoded in any of a variety of ways (e.g., single bit and/or multiple-bit fields) and may convey any of a variety of information (e.g., a slave device identifier or address, an encoding scheme for the raw data, the number of time slots associated with the slave device, power level, operational state, or other information. It should be noted that this is but one example of conveying multiple types of information in a time slot.

Figure 12:
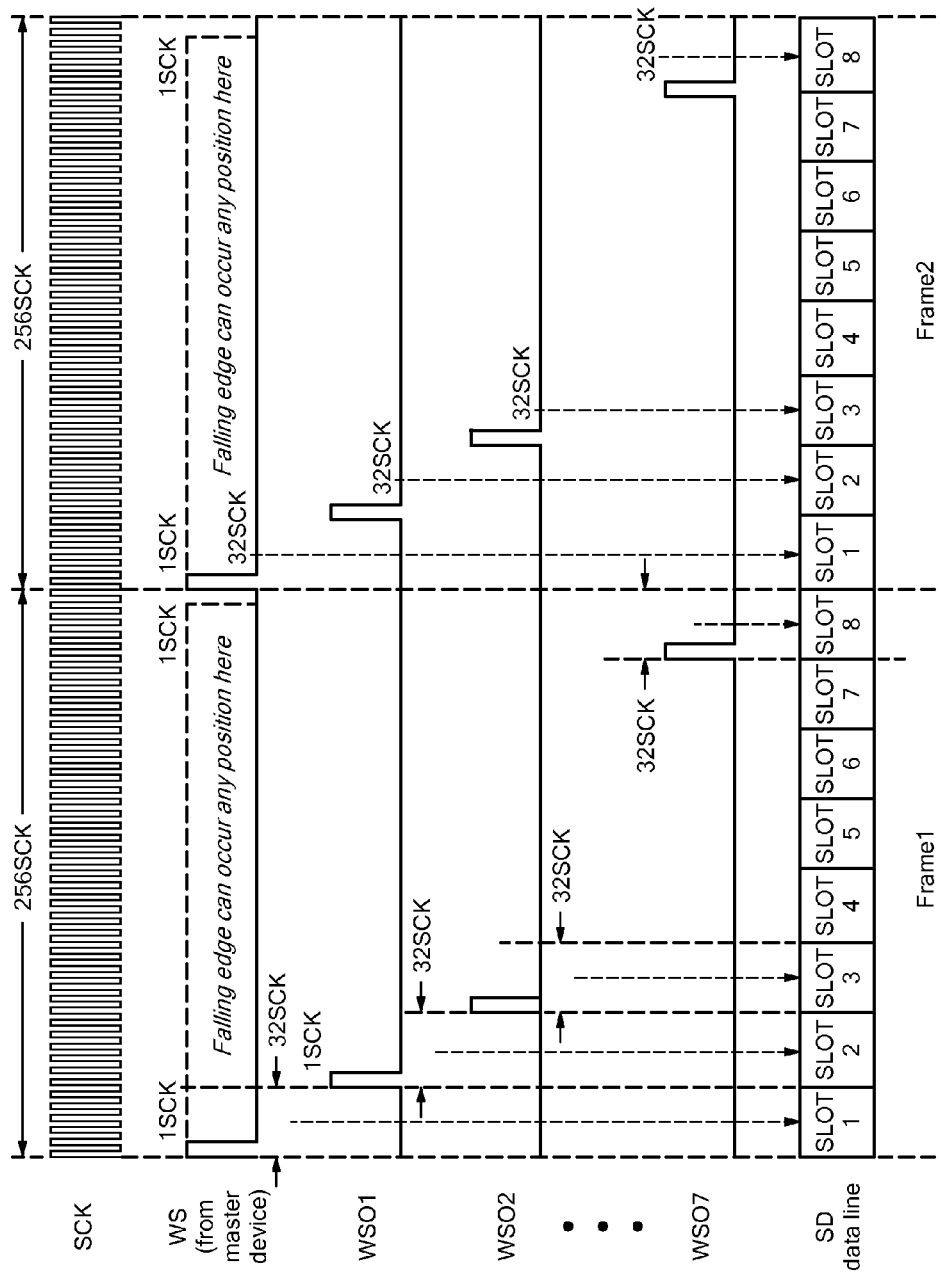
FIG. 12 schematically shows an exemplary timing diagram for an embodiment in which the valid frame signal is a transition from low to high and the duty cycle for the frame synchronization signal is one SCK, in accordance with an exemplary embodiment of the present invention.
Figure 13:
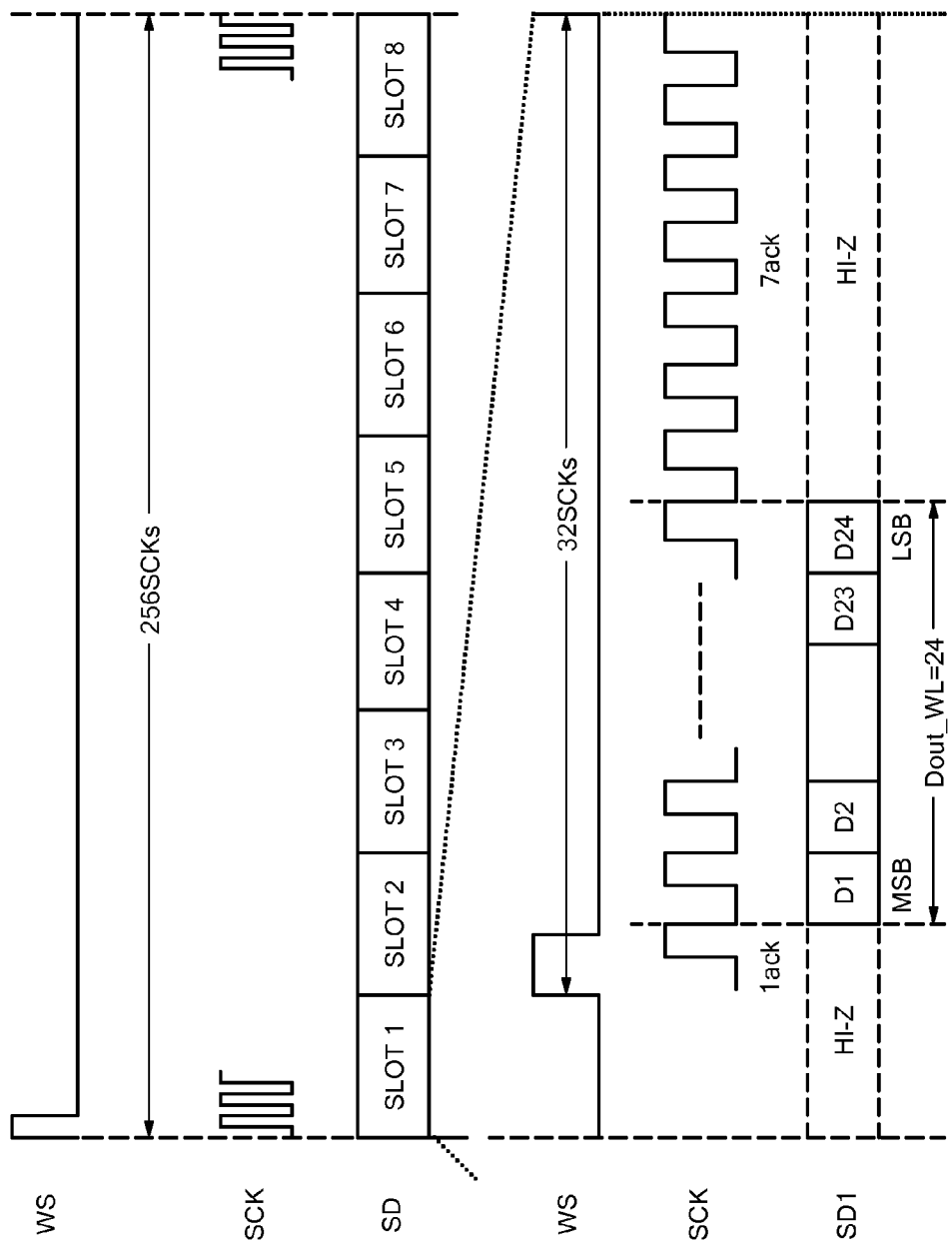
FIG. 13 schematically shows transmission of 24-bit samples in a 32-bit frame as in FIG. 10 using the timing shown in FIG. 12.

In the examples described above, the valid frame signal is represented by a transition from high to low on the WSI line, and the duty cycle of the frame synchronization signal is 50%. However, as mentioned above, other types of frame signals and duty cycles may be used. FIG. 12 schematically shows an exemplary timing diagram for an embodiment in which the valid frame signal is a transition from low to high and the duty cycle for the frame synchronization signal is one SCK, in accordance with an exemplary embodiment of the present invention. FIG. 13 schematically shows transmission of 24-bit samples in a 32-bit frame as in FIG. 10 using the timing shown in FIG. 12.

It should be noted that the TDM interface may be implemented to support bi-directional communication between the controller and the slave device(s). For example, outbound information from the controller to the slave device(s) may be transmitted in certain designated frames or even slots and inbound information from the slave device(s) to the controller may be transmitted in other designated frames or slots. For example, the devices may operate in an outbound communication mode during certain frames (e.g., during an initialization phase during which the controller may configure/program the slave devices, such as with an address and/or operational information) and operate in an inbound communication mode during other frames (e.g., after an initialization phase). Additionally or alternatively, the devices may alternate between outbound and inbound communication modes on a frame-by-frame or other basis.

Generation of an Internal Operational Clock

As discussed above, once enabled, the slave devices typically would start dividing the SCK input by a specific dividing ratio to generate an internal operational clock, such as for clocking an ADC to produce digital samples of an analog input. Often, the internal operational clock operates with a fixed relationship to the frame synchronization signal (e.g., 64*fWS), and in the exemplary embodiments described above, the SCK signal is scaled according to the maximum number of time slots per frame N. In some embodiments, the number of slots per frame N may be built into the system (e.g., N=8) such that the slave devices can be configured with a fixed dividing ratio (e.g., for fSCK=256*fWS with eight 32-bit time slots per frame, the dividing ratio could be fixed at R=256/64=4). Alternatively, the slave devices can determine the dividing ratio dynamically, e.g., by counting the number of SCK cycles per frame (COUNT) and computing the dividing ratio R based on COUNT (e.g., R=COUNT/64 for this particular example). Typically, such a determination would be done during an initialization phase before the slave device begins transmitting or receiving raw data via the SD line.

Figure 14:
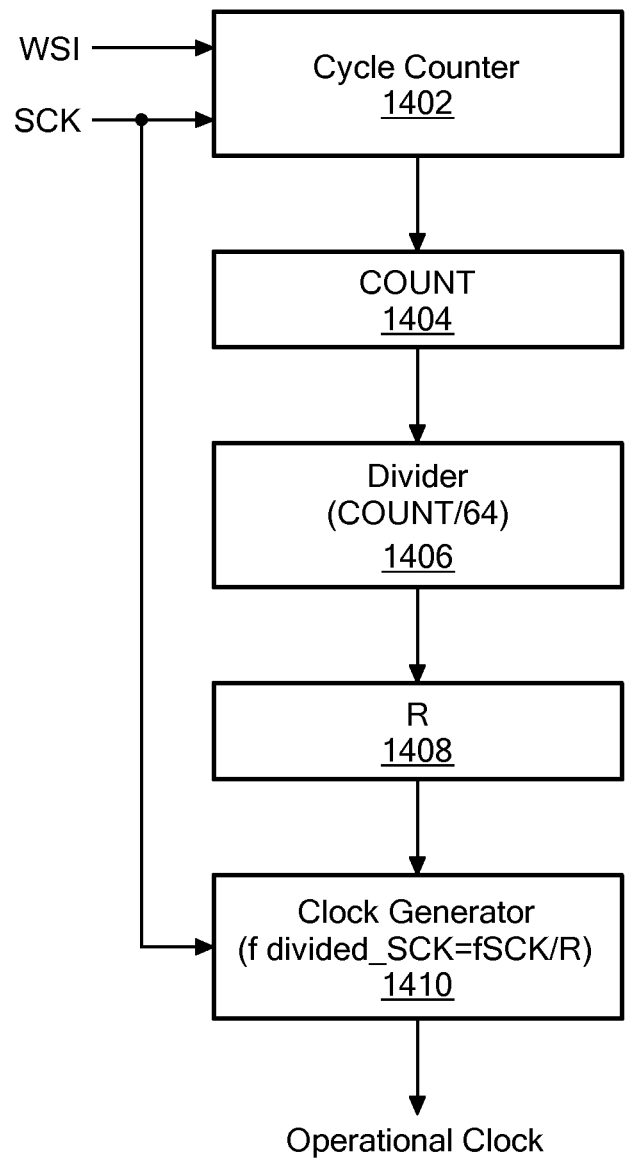
FIG. 14 schematically shows relevant logic blocks for circuitry that dynamically generates the internal operational clock, in accordance with an exemplary embodiment of the present invention.

FIG. 14 schematically shows relevant logic blocks for circuitry that dynamically generates the internal operational clock, in accordance with an exemplary embodiment of the present invention. Among other things, the logic includes a cycle counter 1402 that counts the number of SCK cycles in a frame, a first storage register 1404 (which may be referred to herein as the SCK_num register) for storing the value COUNT, a first divider 1406 that calculates the value R based on COUNT (in this example, R=COUNT/64), a second storage register 1408 for storing the value R, and a divided clock generator 1410 that produces the internal operational clock at a frequency fDIVIDED_SCK=fSCK/R. It should be noted that this is but one example of generating an internal operational clock.

Figure 15:
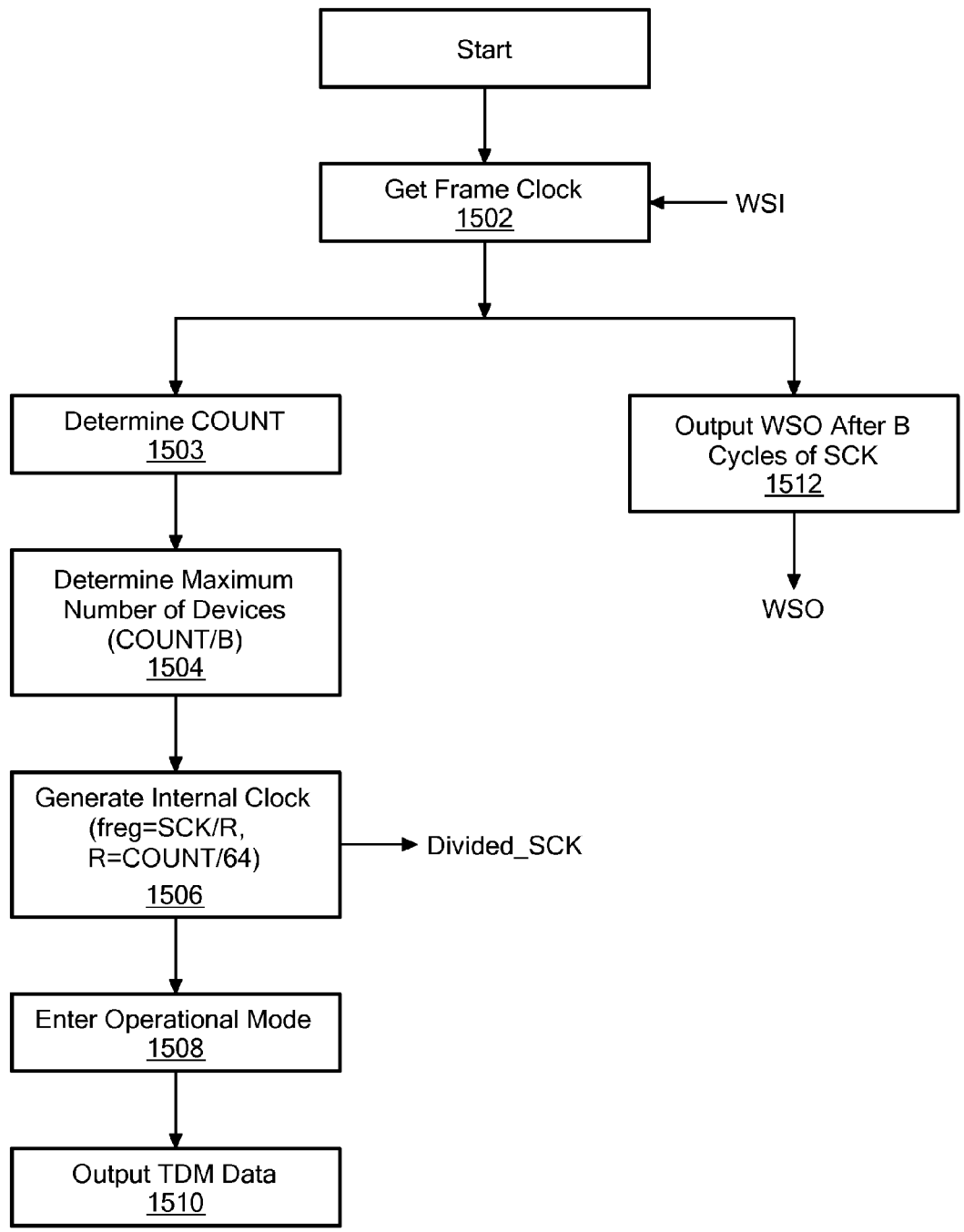
FIG. 15 is a flow chart for TDM operation, in accordance with an exemplary embodiment of the present invention.

FIG. 15 is a flow chart for TDM operation, in accordance with an exemplary embodiment of the present invention. Upon receiving the frame clock in block 1502, the logic enters an initialization stage at block 1503 and also begins outputting the WS signal after B (32 in this example) cycles of SCK in block 1512. In block 1503, the logic counts the number of SCK cycles in a frame to determine COUNT. In block 1504, the logic optionally determines the maximum number of devices that can be in the daisy-chain (in this example, N=COUNT/32 and may be used for power adjustment or other things as discussed below). In block 1506, the logic generates an internal system clock at a frequency fDIVIDED_SCK=fSCK/R (in this example, R=COUNT/64=4 and fDIVIDED_SCK=fSCK/4=64*fWS). The logic then proceeds to block 1508, where the device enters into normal operational mode, for example, generating data based on the internal operational clock and, in block 1510, outputting the data onto the SD line in the designated time slot(s).

Figure 16:
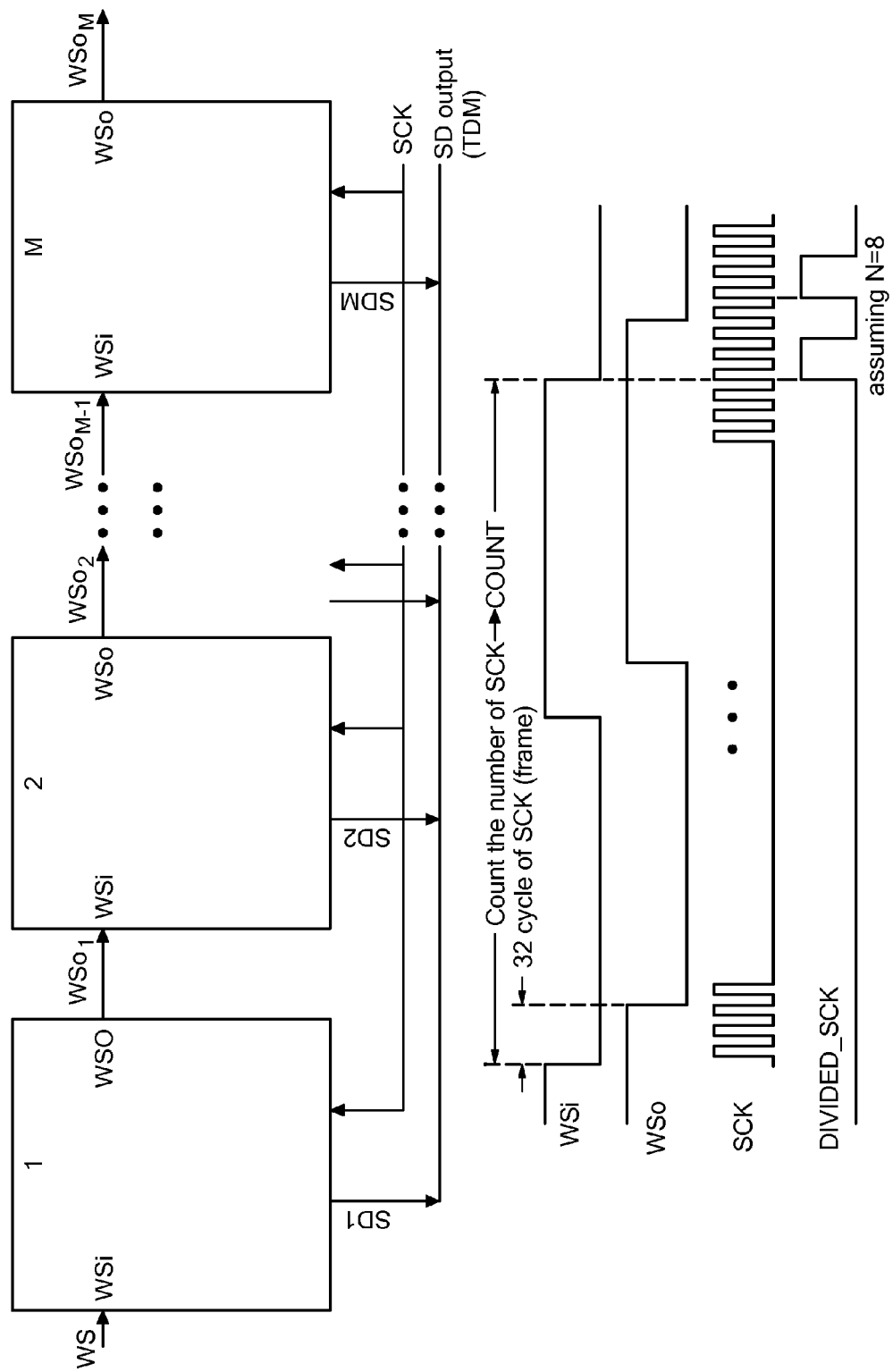
FIG. 16 schematically shows a timing diagram for operation according to the process of FIG. 15, in accordance with an exemplary embodiment of the present invention.

FIG. 16 schematically shows a timing diagram for operation according to the process of FIG. 15, in accordance with an exemplary embodiment of the present invention.

Power Adjustment Based on Maximum Number of Devices

Using a similar technique to the one described above for determining R, each slave device can determine the number of time slots per frame N (e.g., N=COUNT/B) and from this determination can determine the maximum number of slave devices that can be coupled to the SD line. For example, if each slave device is capable of transmitting in one time slot per frame, then the maximum number of slave devices typically would be N; if each slave device is configured to transmit in two time slots per frame, then the maximum number of slave devices typically would be N/2; etc.

Among other things, such determination of the maximum number of slave devices can be used to set the SD pin driver strength of each slave device in proportion to the maximum number of slave devices. Generally speaking, the more slave devices connected for transmission on the SD line, the longer the SD line and the larger the load. Each slave device may be configured with a programmable/configurable SD pin driver, and the SD pin driver strength may be set based on the maximum number of slave devices that can be connected to the SD line (even if that number of slave device is not actually connected to the SD line). Among other things, such dynamic power control may save battery power in devices that support a small number of slave devices. Typically, such dynamic power control would be done during an initialization phase before the slave device begins transmitting raw data onto the SD line.

Figure 17:
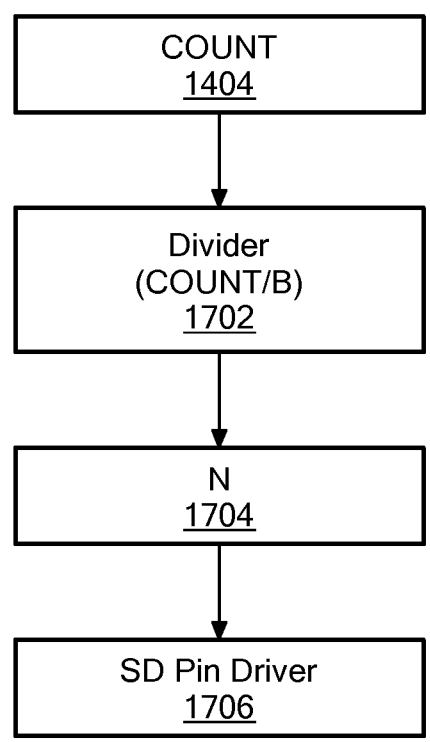
FIG. 17 schematically shows relevant logic blocks for circuitry that dynamically sets the SD pin power strength, in accordance with an exemplary embodiment of the present invention.

FIG. 17 schematically shows relevant logic blocks for circuitry that dynamically sets the SD pin power strength, in accordance with an exemplary embodiment of the present invention. Among other things, the logic includes a divider 1702 that calculates the value N based on the value of COUNT from register 1404 and the value B, a register 1704 for storing the value N, and a programmable SD pin driver 1706 that sets the SD pin driver strength based on the value of N. As mentioned above, the value N may not represent the maximum number of slave devices that can be connected to the SD line, and the logic shown in FIG. 17 can be modified accordingly (e.g., if each slave device transmits in two time slots, N=COUNT/2B).

Miscellaneous

It should be noted that, while certain examples are described above with reference to time slot intervals of 32 SCK cycles, the present invention is not limited to time slot intervals of 32 SCK cycles and is not limited to any particular time slot interval. For example, embodiments can be configured with lower resolutions (e.g., 8 clocks or 16 clocks per time slot) or higher resolutions (e.g., 64 clocks per time slot), with the various clock signals (e.g., WS, internal operational clock) scaled accordingly.

It should be noted that headings are used above for convenience and are not to be construed as limiting the present invention in any way.

Various aspects of the present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof. Computer program logic implementing some or all of the described functionality is typically implemented as a set of computer program instructions that is converted into a computer executable form, stored as such in a computer readable medium, and executed by a microprocessor under the control of an operating system. Hardware-based logic implementing some or all of the described functionality may be implemented using one or more appropriately configured FPGAs.

Computer program logic implementing all or part of the functionality previously described herein may be embodied in various forms, including, but in no way limited to, a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies (e.g., Bluetooth), networking technologies, and internetworking technologies. The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device. The programmable logic may be fixed in a signal that is transmittable to a computer using any of various communication technologies, including, but in no way limited to, analog technologies, digital technologies, optical technologies, wireless technologies (e.g., Bluetooth), networking technologies, and internetworking technologies. The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web). Of course, some embodiments of the invention may be implemented as a combination of both software (e.g., a computer program product) and hardware. Still other embodiments of the invention are implemented as entirely hardware, or entirely software.

The present invention may be embodied in other specific forms without departing from the true scope of the invention. Any references to the "invention" are intended to refer to exemplary embodiments of the invention and should not be construed to refer to all embodiments of the invention unless the context otherwise requires. The described embodiments are to be considered in all respects only as illustrative and not restrictive.

What is claimed is:

1. A time-division multiplexed communication system comprising:
   a data line;
   a controller including a clock output for providing a clock signal, a frame sync output for providing a frame sync signal indicating the beginning of each of a number of successive frames, and a data pin coupled to the data line; and
   at least one slave device in communication with the controller, each slave device including a clock input coupled to the clock output of the controller for receiving the clock signal, a data pin coupled to the data line, a frame sync input, and a frame sync output, the controller and the at least one slave device interconnected in a chain configuration beginning with the controller, wherein the frame sync input of each slave device is coupled to the frame sync output of the previous device in the chain, and wherein the controller provides the frame sync signal on its frame sync output and during a data passing mode each slave device provides a delayed frame sync signal from its frame sync input to its frame sync output and accesses the data line via its data pin in a predetermined set of time slots per frame for at least one of transmitting data to the controller and receiving data from the controller, the predetermined set of time slots selected by the slave device based solely on the frame sync signal received on its frame sync input and the clock signal received on its clock input, wherein each slave device is configured to determine a maximum number of slave devices supported by the controller based on the clock signal and the frame sync signal.

2. A system according to claim 1, where the at least one slave device comprises a plurality of slave devices.

3. A system according to claim 2, wherein all of the slave devices are configured to access the same number of time slots per frame.

4. A system according to claim 2, wherein at least two slave devices are configured to access different numbers of time slots per frame.

5. A system according to claim 2, wherein all of the slave devices are the same type of device.

6. A system according to claim 2, wherein at least two slave devices are different types of devices.

7. A system according to claim 2, wherein the plurality of slave devices are integrated onto a single chip.

8. A system according to claim 7, wherein the controller is integrated with the plurality of slave devices onto the single chip.

9. A system according to claim 1, wherein each slave device is configured to determine a maximum number of slave devices supported by the controller by determining a maximum number of time slots per frame based on the clock signal and the frame sync signal and determining the maximum number of slave devices supported by the controller based on the maximum number of time slots per frame and a predetermined number of time slots per slave device.

10. A system according to claim 1, wherein the data pin of each slave device includes a programmable driver, and wherein each slave device is configured to program a power setting of the programmable driver based on the maximum number of slave devices supported by the controller.

11. A system according to claim 1, wherein the data pin of each slave device is configured as an output for transmitting data to the controller via the data line.

12. A system according to claim 1, wherein the data pin of each slave device is configured as an input for receiving data from the controller via the data line.

13. A system according to claim 1, wherein the at least one slave device includes at least one digital MEMS microphone device.

14. A device for operation in a time-division multiplexed communication system, the device comprising:
a clock input for receiving a clock signal;
a frame sync input for receiving a frame sync signal indicating the start of each of a number of successive frames;
a frame sync output for outputting a delayed frame sync signal; and
a slave TDM bus interface coupled to the clock input, the frame sync input, and the frame sync output and including a data pin for coupling to a data line, wherein the TDM bus interface is configured to provide, during a data passing mode, a delayed frame sync signal from the frame sync input to the frame sync output and to access the data line via the data pin in a predetermined set of time slots per frame for at least one of transmitting data onto the data line and receiving data from the data line, the predetermined set of time slots selected by the slave TDM bus interface based solely on the frame sync signal received on the frame sync input and the clock signal received on the clock input, wherein the TDM bus interface is further configured to determine a maximum number of slave devices that can be supported in a chain based on the clock signal and the frame sync signal received on the frame sync input.

15. A device according to claim 14, wherein the TDM bus interface is further configured to determine a maximum number of slave devices that can be supported in a chain by determining a maximum number of time slots per frame based on the clock signal and the frame sync signal received on the frame sync input and determining the maximum number of slave devices that can be supported in the chain based on the maximum number of time slots per frame and a predetermined number of time slots per slave device.

16. A device according to claim 14, wherein the data pin includes a programmable driver, and wherein the TDM bus interface is further configured to program a power setting of the programmable driver based on the maximum number of slave devices.

17. A device according to claim 14, wherein the data pin is configured as an output for transmitting data onto the data line.

18. A device according to claim 14, wherein the data pin is configured as an input for receiving data from the data line.

19. A device according to claim 14, further comprising a digital MEMS microphone coupled to the slave TDM bus interface.

* * * * *